United States Patent
Hirokawa et al.

(10) Patent No.: US 10,160,112 B2
(45) Date of Patent: Dec. 25, 2018

(54) BICYCLE CLAMP

(71) Applicant: Hirobel LLC, Cleveland Hts., OH (US)

(72) Inventors: Gary Brandon Hirokawa, Cleveland Hts., OH (US); Marc J. Bellett, South Euclid, OH (US)

(73) Assignee: Hirobel LLC, Cleveland Heights, OH (US)

( * ) Notice: Subject to any disclaimer, the term of this patent is extended or adjusted under 35 U.S.C. 154(b) by 0 days.

(21) Appl. No.: 14/303,007

(22) Filed: Jun. 12, 2014

(65) Prior Publication Data

US 2015/0231780 A1 Aug. 20, 2015

Related U.S. Application Data

(60) Provisional application No. 61/940,770, filed on Feb. 17, 2014.

(51) Int. Cl.
| | |
|---|---|
| *B60R 9/10* | (2006.01) |
| *B25H 1/00* | (2006.01) |
| *B60R 9/06* | (2006.01) |
| *F16B 2/08* | (2006.01) |
| *F16M 11/04* | (2006.01) |
| *F16M 11/08* | (2006.01) |

(52) U.S. Cl.
CPC ............ *B25H 1/0014* (2013.01); *B60R 9/06* (2013.01); *B60R 9/10* (2013.01); *F16B 2/08* (2013.01); *F16M 11/04* (2013.01); *F16M 11/08* (2013.01); *Y10S 224/924* (2013.01)

(58) Field of Classification Search
CPC ...... B60R 9/10; B25H 1/0014; Y10S 224/924
USPC ............. 224/924; D12/407, 408; 211/17–22
See application file for complete search history.

(56) References Cited

U.S. PATENT DOCUMENTS

| | | | | |
|---|---|---|---|---|
| 559,312 A | * | 4/1896 | Seely ........................ | B62H 3/00 211/22 |
| 569,289 A | * | 10/1896 | Lynch ...................... | B62H 3/12 211/17 |

(Continued)

FOREIGN PATENT DOCUMENTS

| | | |
|---|---|---|
| DE | 84 05 612 U1 | 5/1984 |
| EP | 0 597 150 A1 | 5/1994 |
| GB | 2 280 653 A | 2/1995 |

OTHER PUBLICATIONS

International Search Report for PCT/US2015/016099 dated Jul. 31, 2015.

*Primary Examiner* — Justin Larson
(74) *Attorney, Agent, or Firm* — Benesch, Friedlander, Coplan & Aronoff LLP (57) ABSTRACT

The present disclosure relates to a bicycle clamp including a rail having an elongated orientation having a first end opposite a second end. A first stabilizer is attached to the rail adjacent to the first end, the first stabilizer configured to at least partially receive an associated frame of a bicycle and a second stabilizer is operably attached to the rail and movable along the rail between the first stabilizer adjacent the first end and the second end. The second stabilizer is adapted to be rigidly attached to the rail at a support position. The second stabilizer is configured to at least partially receive the associated frame of a bicycle wherein the bicycle repair clamp is configured to be placed against the associated frame of a bicycle to support the bicycle in a maintenance position.

17 Claims, 8 Drawing Sheets

(56) References Cited

U.S. PATENT DOCUMENTS

| | | | | |
|---|---|---|---|---|
| 577,910 | A * | 3/1897 | Bierbach | B62H 3/00 211/22 |
| 578,886 | A * | 3/1897 | Le Fevre | B62H 3/00 211/22 |
| 592,544 | A * | 10/1897 | Pearsons | B25H 1/0014 211/22 |
| 594,627 | A * | 11/1897 | Hewlett | B62H 3/00 211/22 |
| 615,995 | A * | 12/1898 | Leonard | B62H 3/00 211/22 |
| 653,519 | A * | 7/1900 | Masters | B62H 3/00 211/163 |
| 3,879,027 | A * | 4/1975 | Thurmond, Jr. | B25H 1/0014 211/22 |
| 4,700,845 | A | 10/1987 | Fretter | |
| 5,320,227 | A * | 6/1994 | Minoura | B25H 1/0014 211/22 |
| 5,373,978 | A * | 12/1994 | Buttchen | B60R 9/06 224/510 |
| 5,377,885 | A * | 1/1995 | Wyers | B60R 9/06 224/314 |
| 5,607,064 | A * | 3/1997 | Fourel | B60R 9/10 211/22 |
| 5,765,821 | A | 6/1998 | Janisse et al. | |
| 5,775,555 | A * | 7/1998 | Bloemer | B60R 9/048 224/502 |
| 5,842,581 | A | 12/1998 | Graefe | |
| 5,996,870 | A * | 12/1999 | Shaver | B60R 9/06 224/324 |
| 6,062,396 | A * | 5/2000 | Eason | A47F 7/04 211/20 |
| 6,283,310 | B1 * | 9/2001 | Dean | B60R 9/048 211/17 |
| 6,431,423 | B1 * | 8/2002 | Allen | B60R 9/048 224/324 |
| 6,467,664 | B2 * | 10/2002 | Robins | B60R 9/06 224/532 |
| 6,516,986 | B1 * | 2/2003 | Lassanske | B60R 9/048 224/502 |
| 6,547,116 | B2 | 4/2003 | Anderson et al. | |
| 6,732,893 | B2 * | 5/2004 | Morris | B60R 9/048 224/502 |
| 6,840,418 | B2 * | 1/2005 | Robins | B60R 9/06 224/532 |
| 7,213,731 | B1 * | 5/2007 | Kolda | B60R 9/048 224/42.39 |
| 7,445,184 | B1 * | 11/2008 | Johnson | B05B 13/0285 248/176.1 |
| 7,448,606 | B1 * | 11/2008 | Johnson | B05B 13/0285 269/16 |
| 7,469,808 | B2 * | 12/2008 | Morales | B60R 9/10 224/537 |
| D612,320 | S * | 3/2010 | Flaherty | D12/408 |
| 7,712,614 | B2 | 5/2010 | Carlson et al. | |
| 7,757,917 | B2 * | 7/2010 | Bogoslofski | B60R 9/06 224/533 |
| D624,004 | S * | 9/2010 | Farber | D12/408 |
| D647,452 | S * | 10/2011 | Laverack | D12/408 |
| 8,141,760 | B2 * | 3/2012 | Kuschmeader | B60R 9/10 224/497 |
| D659,631 | S * | 5/2012 | Laverack | D12/408 |
| 8,220,678 | B2 * | 7/2012 | Bove | B60R 9/10 224/314 |
| 8,220,681 | B2 * | 7/2012 | Farber | B60R 9/06 224/532 |
| 8,235,268 | B2 * | 8/2012 | Sautter | B60R 9/06 224/495 |
| 8,336,747 | B2 * | 12/2012 | Bogoslofski | B60R 9/10 224/534 |
| 8,348,113 | B2 * | 1/2013 | Huang | B60R 9/10 224/567 |
| 8,387,839 | B2 * | 3/2013 | Sautter | B60R 9/06 224/42.13 |
| 8,387,841 | B2 * | 3/2013 | Murray | B60R 9/06 224/314 |
| 8,534,522 | B2 * | 9/2013 | Bogoslofski | B60R 9/06 224/533 |
| 8,931,648 | B1 * | 1/2015 | Tam | B62H 3/00 211/17 |
| 8,931,671 | B2 * | 1/2015 | Olsen | B60R 9/10 224/519 |
| D722,289 | S * | 2/2015 | Williams | D12/408 |
| 8,955,201 | B2 * | 2/2015 | Bogoslofski | A45F 5/00 224/924 |
| 9,068,619 | B2 * | 6/2015 | Bogoslofski | B60R 9/10 |
| 9,156,413 | B2 * | 10/2015 | Liu | B60R 9/10 |
| 2004/0046091 | A1 | 3/2004 | Chuang | |
| 2004/0256430 | A1 * | 12/2004 | Wang | B60R 9/06 224/520 |
| 2007/0057001 | A1 * | 3/2007 | Wang | B60R 9/10 224/536 |
| 2007/0235487 | A1 * | 10/2007 | Bogoslofski | B60R 9/06 224/533 |
| 2010/0237027 | A1 * | 9/2010 | Shaha | B62H 3/12 211/17 |
| 2011/0180578 | A1 * | 7/2011 | Farber | B60R 9/06 224/533 |
| 2011/0220594 | A1 * | 9/2011 | Chuang | B62H 3/00 211/22 |
| 2012/0007298 | A1 | 1/2012 | Proietti | |
| 2012/0043286 | A1 | 2/2012 | Noyes | |
| 2012/0205414 | A1 * | 8/2012 | Bogoslofski | B60R 9/06 224/534 |
| 2013/0020364 | A1 * | 1/2013 | Sautter | B60R 9/06 224/497 |

\* cited by examiner

BICYCLE CLAMP

This application claims priority from and the benefit of U.S. Provisional Patent Application Ser. No. 61/940,770 filed Feb. 17, 2014, the entirety of which is hereby incorporated by reference.

TECHNICAL FIELD

The present exemplary embodiment relates to bicycle repair equipment. It finds particular application in conjunction with an apparatus for stabilizing a bicycle, for example, for maintenance purposes, and will be described with particular reference thereto. However, it is to be appreciated that the present exemplary embodiments are also amenable to other like applications.

BACKGROUND

Bicycle repair equipment such as work stands or benches is often required during the assembly, maintenance and repair of bicycles. Further, bicycle transportation devices are utilized to support a bicycle on a vehicle during transportation. Generally, work stands and transportation devices include various configurations of telescoping members, cantilevered arms, and clamps that are designed to stabilize the bicycle in an elevated position to allow a user to work freely on or transport the bicycle. Conventional bicycle repair and transportation equipment can include a stand or base portion and a mounting portion. The mounting portion generally includes at least one cantilevered arm and/or clamping device that provides a compressive force about the frame or other structural member of the bicycle to secure the bicycle for maintenance. The clamping devices generally include a first arm or jaw and a second arm or jaw that are configured to be operably closed about a single point along the structural portion of the bicycle.

Conventional bicycles, and in particular, the structural portions of the bicycles, are currently made of a variety of materials such as carbon fiber, bamboo, aluminum, or specialty metal alloys. These materials can be costly to produce and shape into the structural portions of the bicycle such as the frame. The clamping devices of conventional repair stands are positioned along a single point of the bike frame and have been known to cause damage to these materials due to excess pressure. Additionally, moment forces acting on the bicycle can cause damage due to the single point position of the clamping device along the frame of the bicycle. In many cases, the bicycle is unbalanced along the clamping device wherein moment forces act on the position of the clamping device thereby causing damage to the bicycle material. These clamping devices have also been known to cause damage due to excess compressive forces caused by the closure of the first and second arms.

Additionally, in some instances, users have supported and transported bicycles with structures having multiple points of contact between the frame and the mounting portion of the bicycle repair or transportation equipment to prevent unwanted moment forces from acting on the bicycle and damaging the frame. One example of a device having multiple points of contact includes a fork mount stand having a pair of cantilevered arms that reach out to support the frame at two locations. Although this type of design may assist to prevent damage to the bicycle due to unbalance moment forces, the pair of cantilever arms prevent the user from adjusting the location of the bicycle frame, prevent rotation and support of the frame, and prevent access to various areas of the frame such that a user is forced to adjust the bicycle on the stand to make complete adjustments to the bicycle. Additionally, the bicycle may be loosely positioned along the cantilevered arms and thereby risks damage to the material do to vibratory forces acting on the vehicle during transportation of the bicycle. The described designs increase the risk of material damage to the bicycle and extend the amount of time that a user will require to sufficiently provide maintenance to a bicycle.

Therefore, there remains a need for a bicycle rack for supporting a bicycle that reduces the risk of causing damage to the bicycle frame or other materials. There is also a need for a bicycle rack that allows a user to adjust the bicycle and allow access to various areas of the frame that may need maintenance without having to readjust the bicycle as it is located on the bicycle rack. There is also a need to provide a secure way to support bicycles that are being transported by vehicle.

SUMMARY

In one embodiment, the present disclosure relates to a bicycle repair clamp including a rail having an elongated orientation having a first end opposite a second end. A first stabilizer is attached to the rail adjacent to the first end, the first stabilizer configured to at least partially receive an associated frame of a bicycle and a second stabilizer is operably attached to the rail and movable along the rail between the first stabilizer adjacent the first end and the second end. The second stabilizer is adapted to be rigidly attached to the rail at a support position. The second stabilizer is configured to at least partially receive the associated frame of a bicycle wherein the bicycle repair clamp is configured to be placed against the associated frame of a bicycle to support the bicycle in a maintenance position.

In another embodiment, the present disclosure relates to a bicycle repair clamp configured to be placed against an associated frame of a bicycle to support the bicycle in a maintenance position. The bicycle repair clamp includes a rail having an elongated orientation having a first end opposite a second end. A first stabilizer is attached to the rail adjacent the first end. The first stabilizer defines a first channel configured to at least partially receive the associated frame of a bicycle. A second stabilizer defines a second channel configured to at least partially receive the associated frame of the bicycle. The first and second channels are generally aligned along a common axis. The second stabilizer includes a clamp that extends from the second head and is operably attached to the rail such that the second stabilizer is movable along the rail between the first stabilizer adjacent the first end and the second end. The clamp includes a tightening mechanism that is configured to be toggled between a tightened position and a loose position such that the second stabilizer is adapted to slide along the rail in the loose position and be rigidly attached to the rail in a support position when the tightening mechanism is in the tightened position.

In yet another embodiment, the present disclosure relates to a bicycle transportation assembly configured to support at least one associated bicycle on an associated vehicle. The bicycle transportation assembly includes a cantilevered arm and is configured to attach to an associated rear vehicle connector assembly of the vehicle. At least one bicycle clamp is attached to the cantilevered arm. Each bicycle clamp includes a first rail having an elongated orientation having a first end opposite a second end. A first stabilizer is attached to the first rail adjacent the first end, the first stabilizer defines a first channel configured to at least partially receive the associated frame of a bicycle. A second rail having an elongated orientation having a first end opposite a second end. A second stabilizer is attached to the second rail adjacent to the second end. The second stabilizer defining a second channel configured to at least partially receive the associated frame of the bicycle. The first and second channels are generally aligned along a common axis. The first rail and the second rail are operably attached to the cantilevered arm such that the first rail and the second rail are movable relative to the cantilevered arm between a compressed position and an extended position such that the associated frame of the bicycle is positioned at least partially within the first and second channels when the first and second rails are in the compressed position and the associated frame of the bicycle is in a support position when the first and second rails are in the extended position.

BRIEF DESCRIPTION OF THE DRAWINGS

The present disclosure may take form in certain parts and arrangements of parts, an embodiment of which will be described in detail in this specification and illustrated in the accompanying drawings which form a part hereof and wherein.

DETAILED DESCRIPTION

It is to be understood that the detailed figures are for purposes of illustrating exemplary embodiments only and are not intended to be limiting. Additionally, it will be appreciated that the drawings are not to scale and that portions of certain elements may be exaggerated for the purpose of clarity and ease of illustration.

Figure 1:
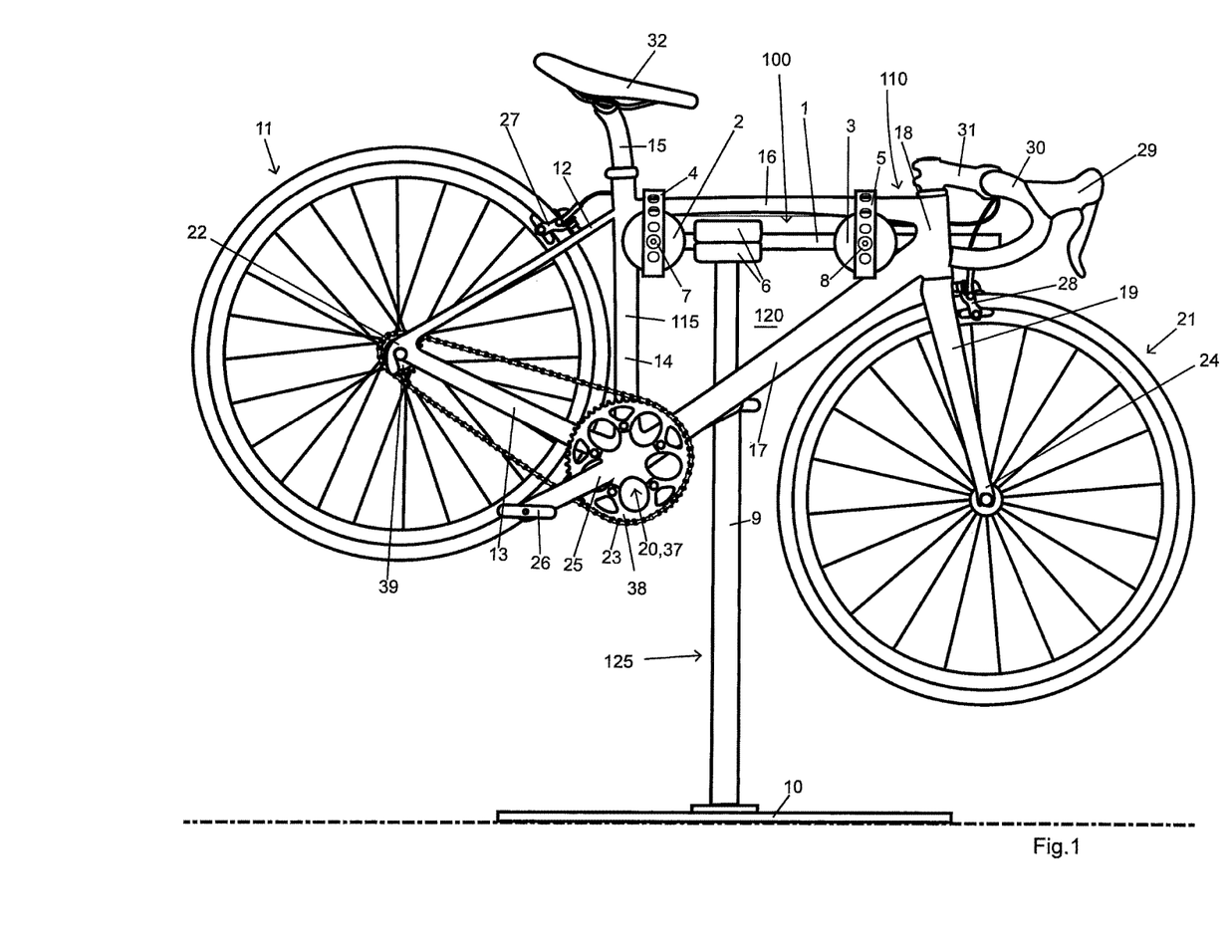
FIG. 1 is a front view of the bicycle repair clamp of the present embodiment supporting a bicycle on a bicycle repair stand.
Figure 5:
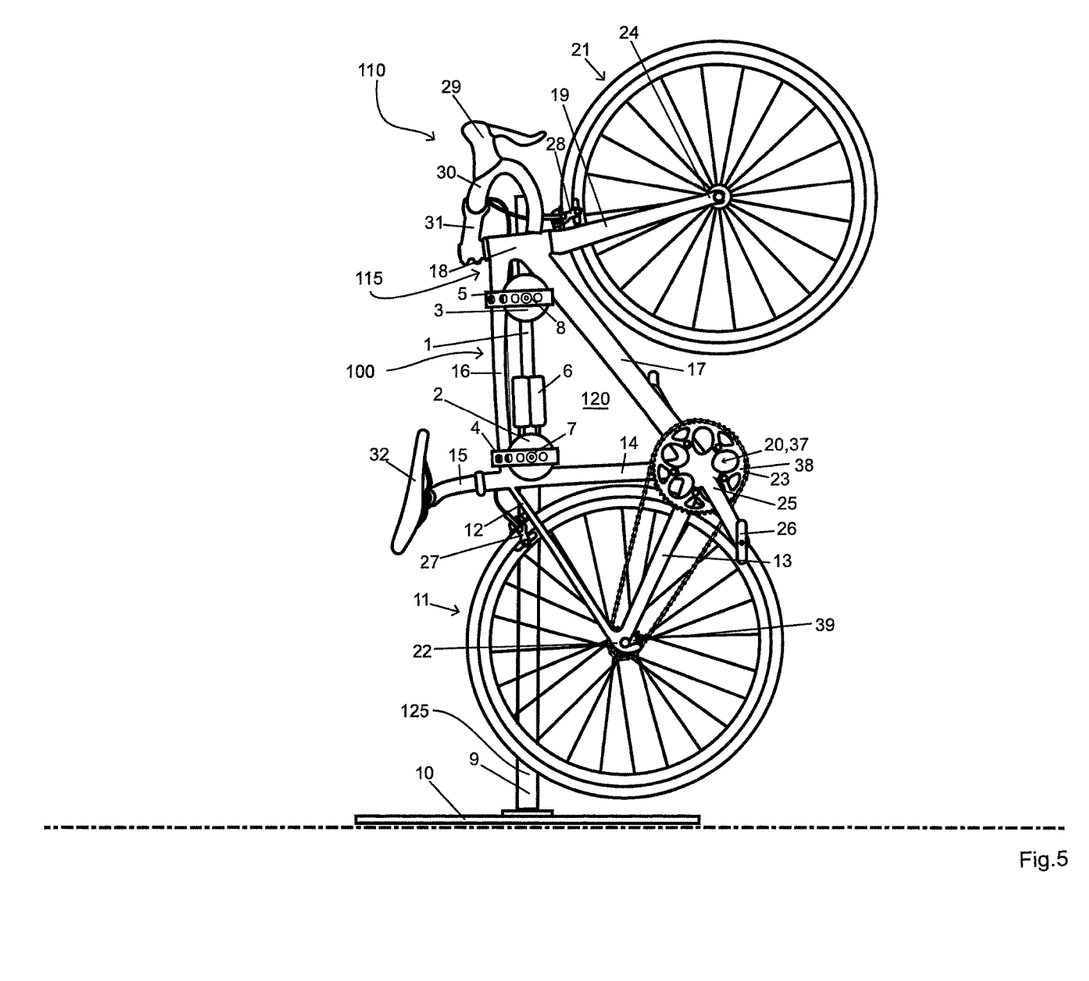
FIG. 5 is a front view of the bicycle repair clamp of FIG. 1 supporting a bicycle on a bicycle repair stand with the bicycle repair clamp, bicycle and a portion of the bicycle repair stand rotated about 90 degrees.

With reference to FIG. 1 and FIG. 5 there is shown a conventional bicycle 110 engaged by and supported by a bicycle clamp 100 according to the present disclosure. The associated bicycle 110 includes a frame 115 that is comprised of a top tube 16, head tube 18, down tube 17, bottom bracket shell 20, chain stays 13, rear dropout 22, seat stays 12, and seat post 14. A front fork 19 is attached to the head tube 18 of the frame 115 via a steer tube which passes through the frame's head tube 18 and is secured in place by a stem 31. Handle bars 30 are attached to the stem 31 and support shift and brake levers 29 thereon.

Attached to the seat post 14 of the frame 115 is a seat post 15 that supports a seat 32 that can be adjusted within the frame 115. Pedals 26 are attached to cranks 25 that support chain rings 38 attached to a drive side (right) crank 25. The crank 25 passes through a bottom bracket 37 (bearing assembly) that is attached to the bottom bracket shell 20 of the frame 115. The front wheel 21 attaches to the frame 115 at front dropouts 24. The rear wheel 11 attaches to the frame 115 at the rear dropouts 22. A chain 23 attaches around a rear cog 39 of the rear wheel 11 and passes through a rear triangle created by the seat post 14, chain stay 13, and seat stay 12, then continues around the chain rings 38 attached to the crank 25.

The frame 115 portion of the bicycle 110 can be a material such as carbon fiber, aluminum, or specialty metal alloys. The materials could also include wood, bamboo or the like. The frame 115 has a structural portion 120 that is defined at least by the seat post 14, the top tube 16, the down tube 17, and the head tube 18. Generally, frames can have a structural portion 120 of various shapes and configurations. In one embodiment, as illustrated by FIGS. 1 and 5, the structural portion 120 defines an enclosed area of the bicycle wherein the seat post 14 is oppositely spaced from the head tube 18 and the top tube 16 is oppositely spaced from the down tube 17. These members are interconnected to from a triangular shaped structural arrangement in a continuous manner. However, this configuration could be varied in its arrangement and shape.

The bicycle is suspended above the ground in a maintenance position by the bicycle repair clamp 100, which in turn is held by a bicycle repair stand 125. The repair stand includes a repair stand base 10, a main pipe 9, and an attachment mechanism such as clamp jaws 6. The bicycle repair clamp 100 is attached to a top portion of the main pipe 9 and is configured to be laterally adjusted upwardly or downwardly to vary the height of the stand 125.

The clamp 100 includes a clamp adjustment rail 1, which is held by the repair stand clamp jaws 6. A first stabilizer 2 and a second stabilizer 3 are directly coupled or affixed to the clamp adjustment rail 1. These stabilizers 2 and 3 are configured to secure the structural portion 120 of the frame 115 by at least partially receiving the frame and engaging adjacent the seat post 14, the top tube 16, the down tube 17 and the head tube 18 of the frame 115.

The first and second stabilizers 2, 3 include tube straps 4 and 5, respectively. The tube straps 4, 5 are configured to secure the frame 115 by wrapping over the top tube 16 and attaching to rear strap tension post 7 of the first stabilizer 2 and a front strap tension post 8 of the second stabilizer 3. This configuration can provide additional assurance against unwanted movement of the bicycle while it is supported by the clamp 100.

As illustrated by FIGS. 1 and 5, the first stabilizer 2 of the clamp 100 is fixed relative to the adjustment rail 1 and is positioned within the frame 115 and against both the top tube 16 and the seat post 14. In one embodiment, the second stabilizer 3 is coupled and adjustable relative to the adjustment rail 1 of the clamp 100. See FIG. 3A. In this embodiment, the second stabilizer 3 is manually translated along the adjustment rail 1 to extend away from the first stabilizer 2 and be positioned in a support position against the frame 115. The support position of the second stabilizer 3 is within the structural portion 120 of the frame 115 against the top tube 16 and down tube 17 adjacent to the head tube 18. The second stabilizer 3 is clamped or locked against the adjustment rail 1 in the support position and prevented from further lateral movement. The first stabilizer 2 and second stabilizer 3 provide a force against opposite interior portions of the frame 115 to secure the clamp 100 within the frame 115 of the bicycle.

Figure 3A:
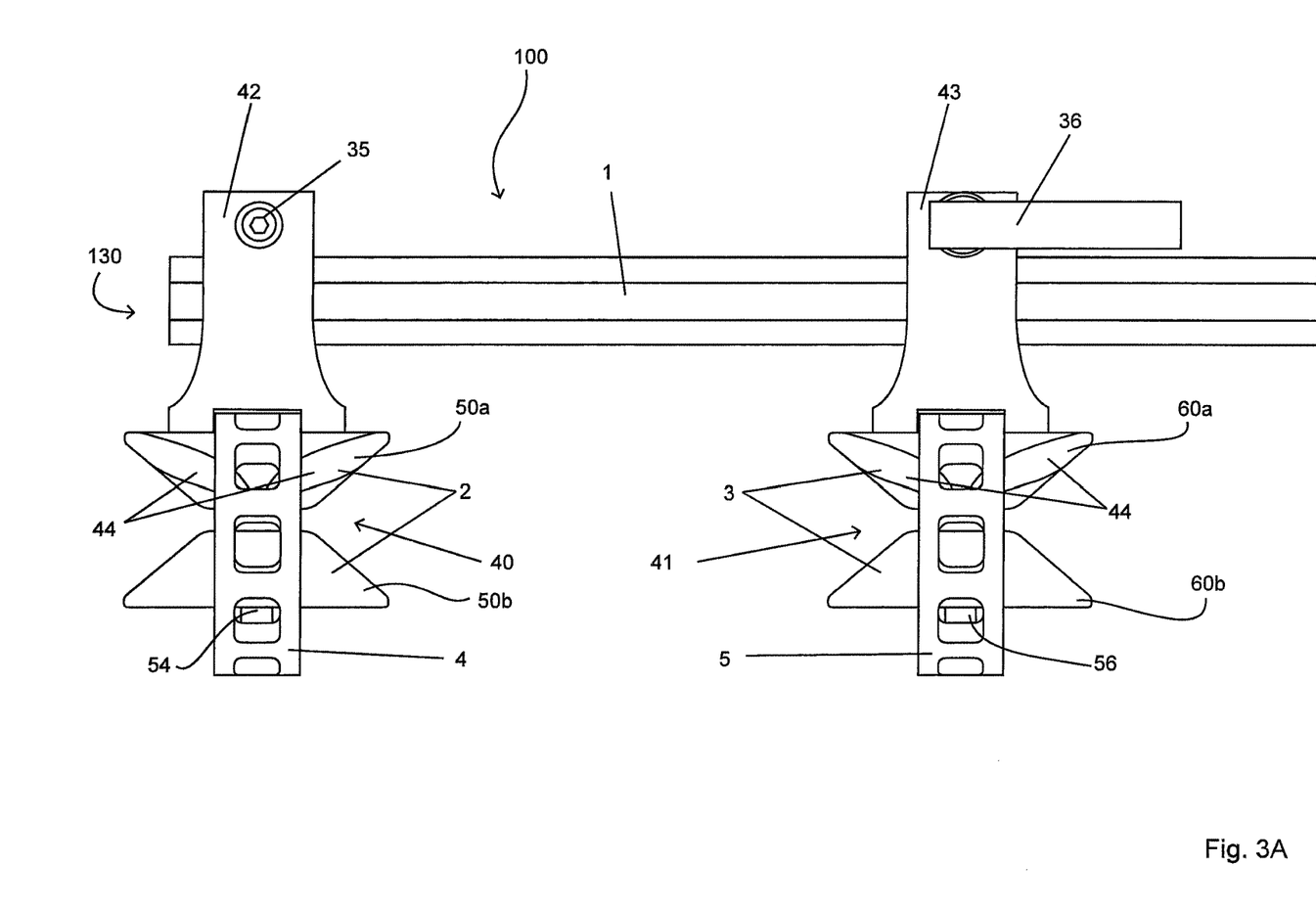
FIG. 3A is a top view of one embodiment of the bicycle repair clamp of the present disclosure.
Figure 3B:
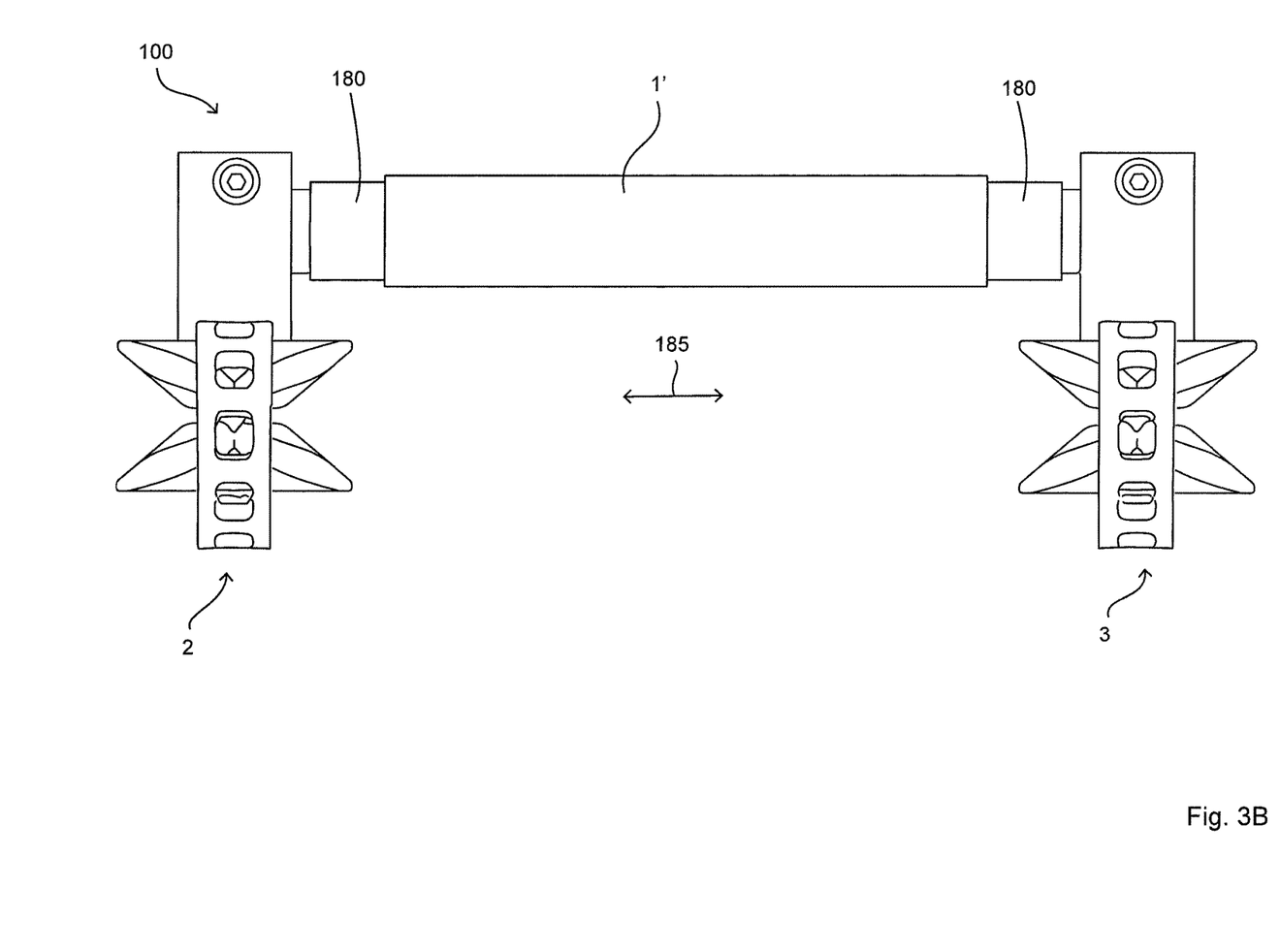
FIG. 3B is a top view of another embodiment of the bicycle repair clamp of the present disclosure.

In an alternate embodiment illustrated by FIG. 3B, adjustment rail 1' is an elongated telescoping body having a plurality of tubes 180 that allows the first and second stabilizers 2, 3 to extend away from one another and be positioned within the frame 115 of the bicycle. In this embodiment, the second stabilizer 3 extends away from the first stabilizer 2 along a common axis 185 after it is positioned within the frame 115. The first stabilizer 2 is then positioned against the seat post 14 and top tube 16. The second stabilizer 3 is positioned against the top tube 16 and down tube 17 adjacent to the head tube 18. The first stabilizer 2 and second stabilizer 3 are clamped or locked in this extended position along the adjustment rail 1' by a fastener, such as a lock or a collar (not shown) positioned along the rail 1'. In this embodiment, the first stabilizer 2 and second stabilizer 3 provide a force against opposite interior portions of the frame 115 to secure the clamp 100 within the frame 115 of the bicycle.

Figure 2:
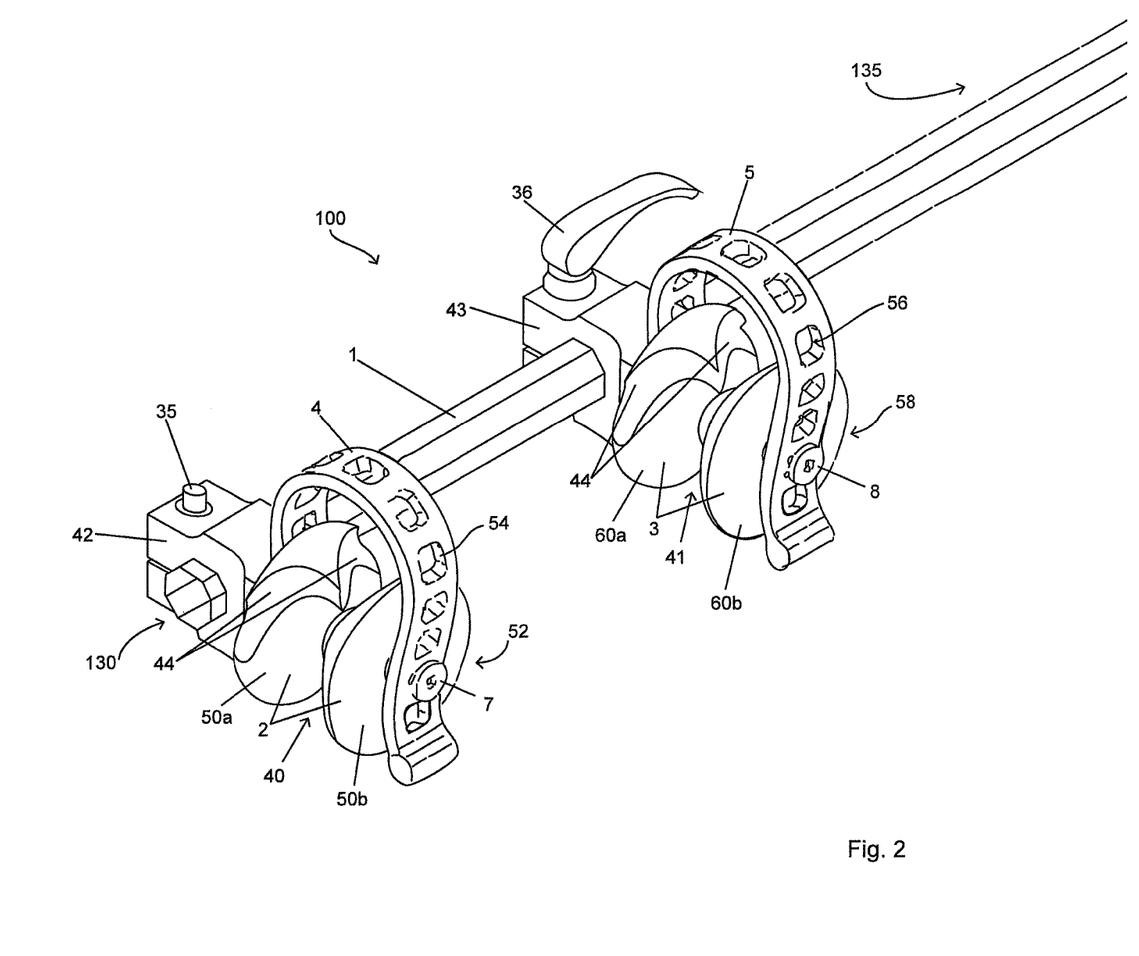
FIG. 2 is a perspective view of one embodiment of the bicycle repair clamp of the present disclosure.
Figure 4:
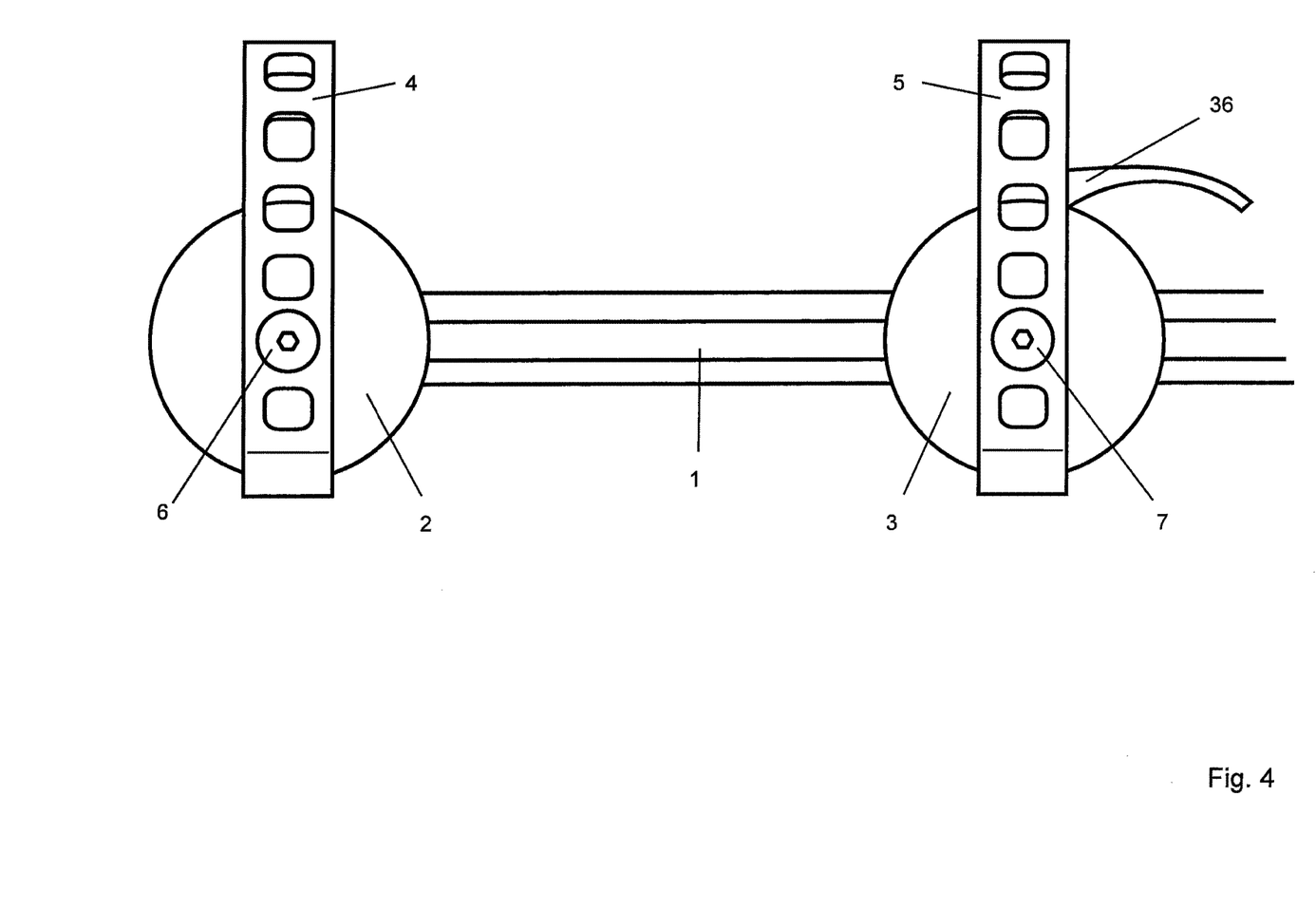
FIG. 4 is a side view of the bicycle repair clamp of the present disclosure.

FIG. 2-4 illustrate enlarged versions of the bicycle repair clamp 100. The adjustment rail 1 is a generally elongated structural member that includes a first end 130 and an opposite second end 135. The adjustment rail 1 can optionally be made from various rigid materials such as aluminum, wood, various metals, polymers or alloys and include various cross sectional profile shapes such as a circle, oval, or polygon. Additionally, a notch or key could be added to the profile of the rail 1 along with various other shapes that can assist to prevent rotation of the first and second stabilizers 2, 3 relative to the rail 1. The adjustment rail 1 is supported by the clamp jaws 6 of the repair stand 125. The clamp jaws 6 can be configured to rotate the clamp 100 and therefore the bicycle in various positions above the ground such as horizontal relative to the ground (FIG. 1) and vertical relative to the ground (FIG. 5). The attachment mechanism 6 is configured to rotate around an axis that extends from the stand 125 such that the bicycle repair clamp 100 can support the bicycle at various angular positions relative to the stand assembly 125.

The first stabilizer 2 includes a first clamp 42 that is coupled to the adjustment rail 1 at a position adjacent the first end 130. Optionally, the clamp 42 could be any type of connector assembly that is configured to couple the first stabilizer 2 to the adjustment rail 1 and this disclosure is not limited to clamps. In one embodiment, the clamp 42 is provided with a tightening mechanism 35 such as a conventional fastener to allow a user to tighten the clamp 42 in a rigid attachment and to loosen the clamp to move, replace or fix the first stabilizer 2 separate from the adjustment rail 1.

The first stabilizer 2 includes a rear strap tension post 7 that extends from the clamp 42 and through a first support head 50a and a second support head 50b. The tube strap 4 includes a plurality of apertures 54 along its length and is attached to the tension post 7 between the clamp 42 and first support head 50a. The tube strap 4 is adapted to wrap around the first support head 50a, the top tube 16 of the frame 115, and the second support head 50b to be operably attached to an exposed end 52 of the tension post 7 that extends opposite from the clamp 42. The first stabilizer 2 supports the bicycle along the seat post 14 as illustrated by FIGS. 1 and 5.

The second stabilizer 3 is positioned along the adjustment rail 1 and is positioned opposite from the first stabilizer 2 on the first end 130 of the rail 1. The second stabilizer 3 is coupled to the rail 1 and movable away from the first stabilizer 2. In one embodiment, the second stabilizer 3 is movable along the rail 1 between the first stabilizer 2 adjacent the first end 130 and the second end 135 of the rail 1. The second stabilizer 3 is adapted to be fixed to the rail 1 at a support position wherein the second stabilizer 3 abuts against the frame 115 of a bicycle such that the bicycle repair clamp 100 supports the associated frame of a bicycle in an elevated position that is above the ground.

The second stabilizer 3 includes a second clamp 43 that is slidably attached to the rail 1. The second clamp having a tightening mechanism 36 attached to the clamp 43. The tightening mechanism is configured to be toggled between a tightened position and a loose position such that the clamp 43 is adapted to slide along the rail 1 in the loose position. The clamp 43 is fixed along the rail in the tightened position. In one embodiment, the second stabilizer 3 and clamp 43 are positioned in the support position when the stabilizer 3 is linearly moved along the rail 1 and at least partially receives and abuts against the frame 115 adjacent the head tube 18 such that the first stabilizer 2 is sufficiently abutted against the seat post 14 and top tube 16. Optionally, the clamp 43 could be any type of connector assembly that is configured to perform in the described manner.

However, additional embodiments of the first and second stabilizer 2, 3 are contemplated. In particular, the first stabilizer 2 and second stabilizer 3 may both be movable along the rail 1 such that tightening mechanism 35 is comparable to that shown or disclosed as tightening mechanism 36 attached to the second stabilizer 3. The tightening mechanisms 35 and 36 may take a variety of forms to ensure that the first and second stabilizers 2, 3 are configured to be placed in the support position along the rail 1 and within the frame 115. The first stabilizer 2 is positioned in the support position when it extends against the frame 115. The second stabilizer 3 is positioned in the support position when it extends against the frame 115 at an opposite side of the first stabilizer 2.

The second stabilizer 3 includes a front strap tension post 8 that extends from the clamp 43 and through first support head 60a and second support head 60b. The tube strap 5 includes a plurality of apertures 56 along its length and is attached to the tension post 8 between the clamp 43 and first support head 60a. The tube strap 5 is adapted to wrap around the first support head 60a, the top tube 16 of the frame 115, and the second support head 60b to be operably attached to an exposed end 58 of the tension post 8 that extends opposite from the clamp 43. The second stabilizer 3 supports the bicycle adjacent the head tube 18 as illustrated by FIGS. 1 and 5.

The tube straps 4 and 5 can be made of rubber, nylon, plastics or various other materials having a variety of configurations. Preferably, the straps are made of a material that would not mar or harm the surface of the frame 115. The top tube straps 4 and 5 may be made of a material that provides enough strength to support the weight of the bicycle when inverted and enough elasticity to accommodate various tube shapes and sizes.

The first and second support heads 50a, 50b of the first stabilizer 2 defines a first channel 40. The first and second support heads 60a, 60b of the second stabilizer 3 defines a second channel 41. These support heads additionally are incised with grooves 44 that are adapted to receive brake cables that extend along the frame 115 of the bicycle without damaging the surface of the support heads. These grooves 44 allow the bicycle frame to be fully supported inside the stabilizer channels 40 and 41 without having the brake cables interfere with the frame being properly secured.

Additionally, in one embodiment the support heads have a generally common shape and are made from a polymer that ranges from semi-rigid to soft. In one embodiment, the material is non-marring rubber or other material that includes a durometer hardness that ranges between a medium to high durometer rating and includes a non-marring surface that supports the frame 115 but will minimize damage to sensitive frame materials. The range of the duro rating can be about 50 to about 90 durometer. In one embodiment, the duro rating is about 70 duro. In one embodiment, the support heads 50*a*, 50*b*, 60*a*, 60*b* each have a generally frustoconical shaped body wherein the slender portions of the frustoconical shaped body are configured to face one another along the tension posts 7 and 8. The surface of this generally furstoconical shaped body helps to define the channels 40, 41 that receive the frame 115 therein. However, the profile shape of the support heads could include various contours that define the channels to generally align with a profile shape of conventional bicycle frames.

In one embodiment, the first clamp 42 is coupled to the rail 1 such that the first stabilizer 2 does not rotate relative to the rail 1. Additionally, the second clamp 43 is coupled to the rail 1 such that the second stabilizer 3 can linearly translate along the rail 1 while maintaining alignment with the first stabilizer 2. More particularly, the second stabilizer 3 does not rotate relative to the rail as it is either being translated or as it is fixed in the support position. This allows the first channel 40 to maintain alignment with the second channel 41 along a common axis wherein the common axis is generally parallel with a longitudinal axis of the adjustment rail 1.

The shape and adjustability of the stabilizers 2, 3 and top tube straps 4, 5 secure the bicycle to the repair clamp 100 and minimize unwanted movement (both forward-back and side-to-side) without applying a damaging level of compressive force. The rail 1, clamps 42 and 43, and tension posts 7 and 8, as well as mounting hardware such as fasteners may be made of aluminum, steel, or any other sufficiently rigid and strong material such as high strength plastic, wood, or the like.

Unintended movement of the bicycle is prevented by the stabilizers as the frame 115 is at least partially received within the channels 40 and 41 defined by the support heads 50*a*, 50*b* and 60*a*, 60*b* as seen in FIG. 2, FIGS. 3A and 3B. Structural support of the bicycle is provided by sliding the adjustable stabilizer 3 forward within the bicycle frame 115 until it contacts a junction adjacent where the top tube 16, head tube 18, and down tube 17 connect. The junction and location of the support position of the adjustable stabilizer 3 generally depends on the size and configuration of the bicycle frame 115 as two or three of the adjacent frame tubes, opposite the seat post 14, will be in contact with the second stabilizer 3. The rear top tube strap 4 and front top tube strap 5 secure the bicycle frame from falling out of the first stabilizer 2 and second stabilizer 3 when the bicycle is rotated away from a horizontal orientation (See FIG. 5). Stated another way, the bicycle clamp 100 utilizes opposing forces provided by the first and second stabilizer 2, 3 against opposing portions of the bicycle frame 115 to secure the bicycle in an elevated position above the ground for maintenance or storage.

The bicycle clamp 100 supports a bicycle for repair in a manner that allows the user to apply the necessary force required for said repair without the bicycle exhibiting unwanted movement or experiencing excessive compressive pressure on the bicycle frame 115. Additionally, the first and second stabilizers 2, 3, of the bicycle repair clamp 100 provide support for the bicycle frame 115 as it is being secured, a feature that current designs neglect. Further still, the bicycle clamp of the present disclosure allows maintenance to be performed on all parts of the bicycle without necessitating the removal of components or impeding access to other components. In its illustrated embodiment, the clamp 100 is adapted to be used with repair stands currently in use in many bicycle repair shops and homes, but it could easily be adapted for use on its own stand.

Figure 6:
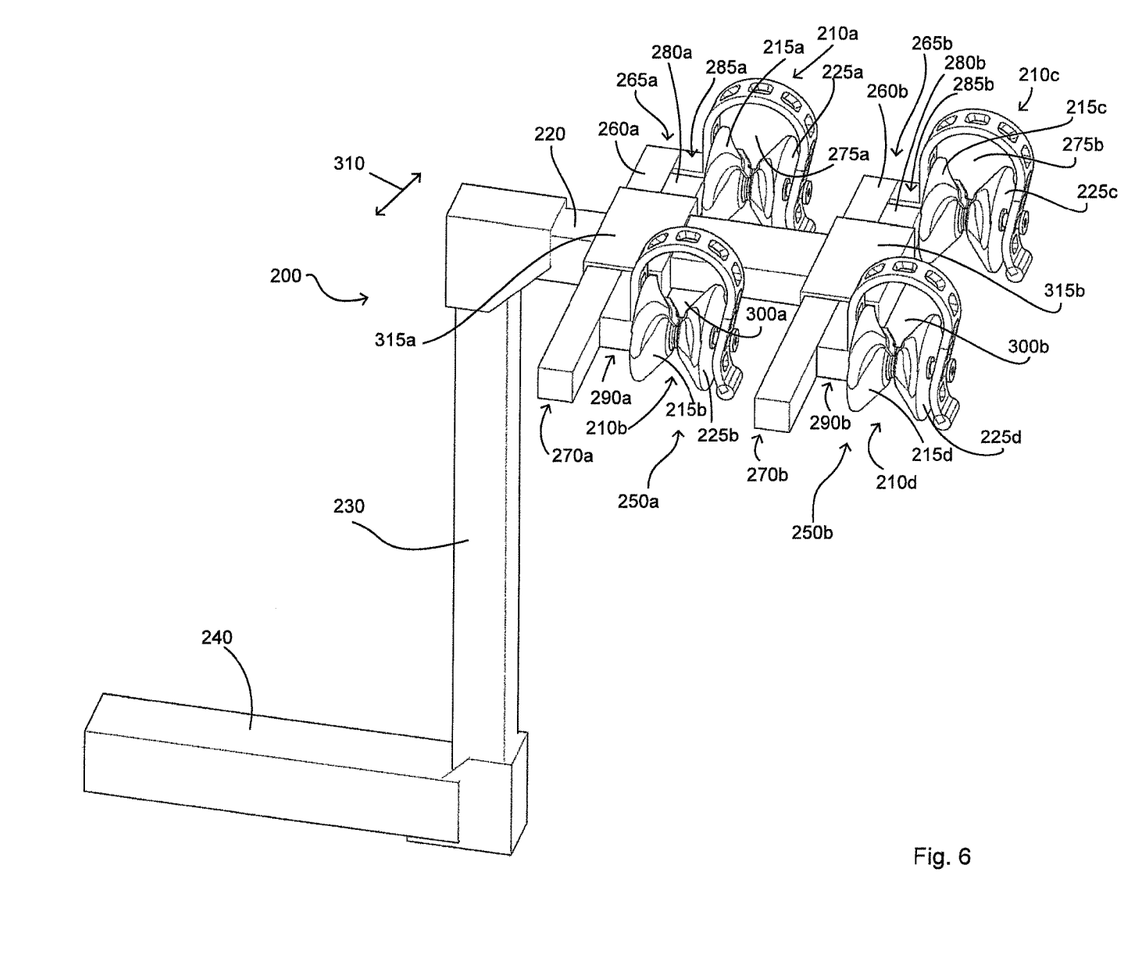
FIG. 6 is a perspective view of one embodiment of a plurality of bicycle support clamps for supporting bicycles on a vehicle during transport.
Figure 7:
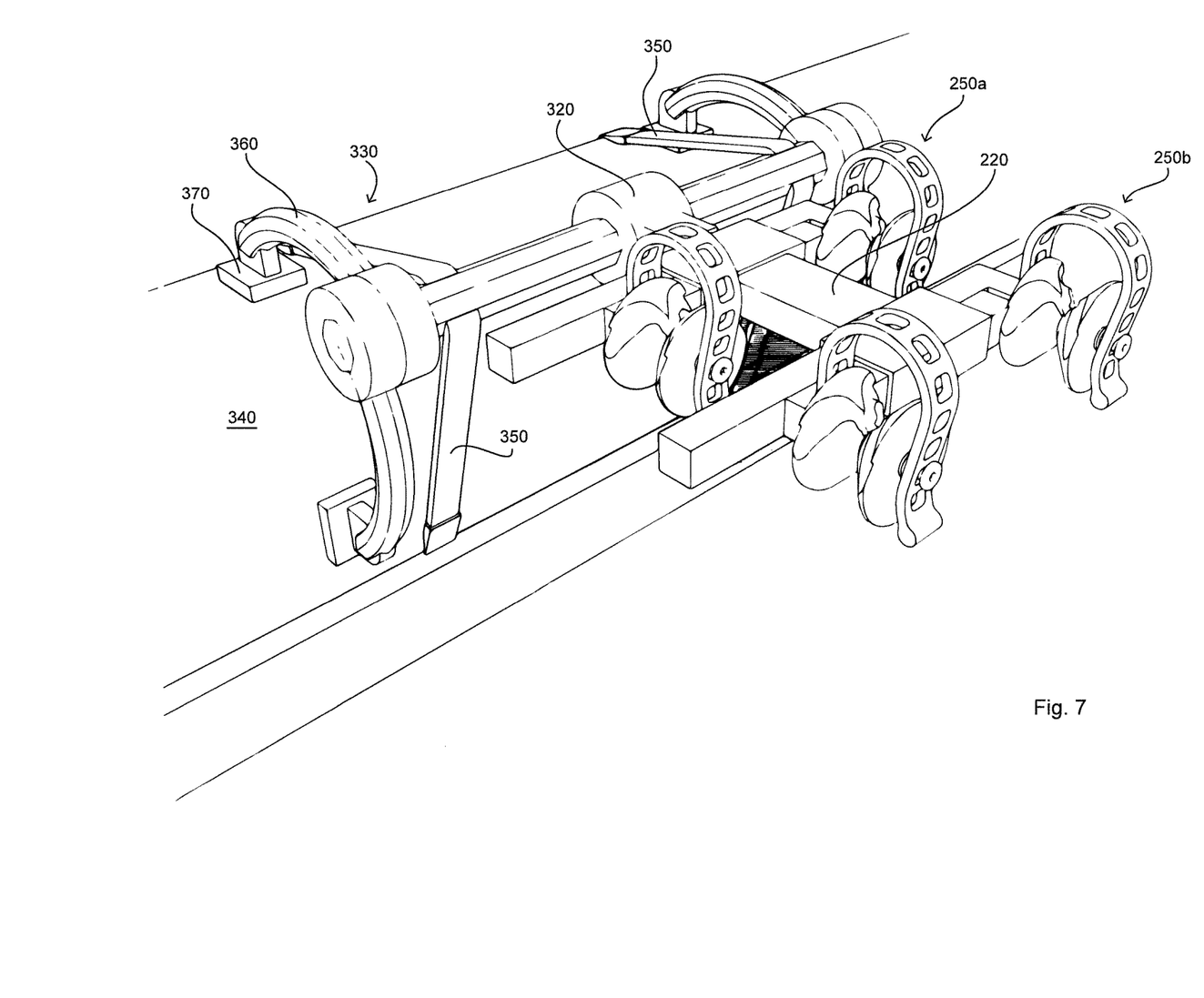
FIG. 7 is a perspective view of another embodiment of the plurality of bicycle support clamps for supporting bicycles on a vehicle during transport.

In another embodiment, as illustrated by FIGS. 6 and 7, a bicycle support assembly 200 is provided having a first bicycle clamp 250*a* and a second bicycle clamp 250*b* with a plurality of stabilizer members 210*a*, 210*b*, 210*c*, 210*d* for supporting a pair of bicycles on a vehicle during transport. However, this configuration is not limiting as various arrangements of the stabilizer members 210*a*-210*d* are contemplated to support fewer or a greater number of bicycles on the assembly 200 during transport.

The support assembly 200 is configured to be attached to an associated rear vehicle connector assembly that is configured to be attached to a hitch assembly or, alternatively, be placed on a back door/window of a vehicle with a plurality of straps to support the rear vehicle connector assembly on the vehicle in a generally cantilevered orientation. In the embodiment of FIG. 6, the bicycle transportation assembly 200 includes a cantilevered arm 220 that supports the plurality of stabilizer members 210*a*-210*d* and a structural arm 230 that is configured to attach to a hitch arm 240 to attach to a conventional hitch assembly (not shown) on the vehicle. The structural arm 230 extends from the cantilevered arm 220 to the hitch arm 240.

In one embodiment as illustrated in FIG. 6, a first bicycle clamp 250*a* and a second bicycle clamp 250*b* are attached to the cantilevered arm 220. The first bicycle clamp 250*a* includes a first rail 260*a* having an elongated orientation with a first end 265*a* opposite a second end 270*a*. A first stabilizer 210*a* is attached to the first rail 260*a* adjacent the first end 265*a*. The stabilizers 210*a*-210*d* include similar features to the stabilizers 2 and 3 of the previous embodiments of FIGS. 1-5. The first stabilizer 210*a* includes a first support head 215*a* and a second support head 225*a* defining a first channel 275*a* configured to at least partially receive the frame of a bicycle. A second rail 280*a* is movably positioned adjacent to the first rail 260*a* and includes an elongated orientation having a first end 285*a* opposite a second end 290*a*. The second stabilizer 210*b* is attached to the second rail 280*a* adjacent to the second end 290*a*. The second stabilizer 210*b* includes a first support head 215*b* and a second support head 225*b* defining a second channel 300*a* configured to at least partially receive the frame of the bicycle. The first and second channels 275*a*, 300*a* of the first bicycle clamp 250*a* are generally aligned along a common axis.

The first rail 260*a* and the second rail 280*a* are operably attached to the cantilevered arm 220 such that the first rail 260*a* and the second rail 280*a* are movable relative to the cantilevered arm 220 between a compressed position and an extended position. The frame of the bicycle is adapted to be positioned at least partially within the first channel 275*a* and second channel 300*a* of the first stabilizer 210*a* and the second stabilizer 210*b* when the first rail 260*a* and the second rail 280*a* are in the compressed position. The frame of the bicycle is in a support position when the first rail 260*a* and second rail 280*a* are in the extended position. In this embodiment, the first and second rails 260*a*, 280*a* move along an axis identified by movement axis 310.

The support assembly 200 of this embodiment includes a first junction 315a along the cantilevered arm 220 that can include a tightening mechanism (not shown). The rails 260a, 280a are movably received within the first junction 315a. The first rail 260a and the second rail 280a are configured to be toggled between a loose position and a tightened position along movement axis 310 wherein the first rail and the second rail are movable relative to the cantilevered arm 220 in the loose position and fixed relative to the cantilevered 220 arm in the tightened position.

Similarly, the second bicycle clamp 250b includes a first rail 260b having an elongated orientation with a first end 265b opposite a second end 270b. A third stabilizer 210c is attached to the first rail 260b adjacent the first end 265b. The third stabilizer 210c includes a first support head 215c and a second support head 225c defining a first channel 275b configured to at least partially receive the frame of a bicycle. A second rail 280b is movably positioned adjacent to the first rail 260b and includes an elongated orientation having a first end 285b opposite a second end 290b. The fourth stabilizer 210d is attached to the second rail 280b adjacent to the second end 290b. The fourth stabilizer 210d includes a first support head 215d and a second support head 225d defining a second channel 300b configured to at least partially receive the frame of the bicycle. The first and second channels 275b, 300b of the second bicycle clamp 250b are generally aligned along a common axis.

The first rail 260b and the second rail 280b are operably attached to the cantilevered arm 220 such that the first rail 260b and the second rail 280b are movable relative to the cantilevered arm 220 between a compressed position and an extended position. The frame of the bicycle is adapted to be positioned at least partially within the first channel 275b and second channel 300b of the third stabilizer 210c and the fourth stabilizer 210d when the first rail 260b and the second rail 280b are in the compressed position. The frame of the bicycle is in a support position when the first rail 260b and second rail 280b are in the extended position. In this embodiment the first and second rails 260b, 280b move along axis identified by movement axis 310.

The support assembly 200 of this embodiment includes a second junction 315b along the cantilevered arm 220 spaced from the first junction 315a that can include a tightening mechanism (not shown). The rails 260b, 280b are movably received within the second junction 315b. The first rail 260b and the second rail 280b are configured to be toggled between a loose position and a tightened position along movement axis 310 wherein the first rail and the second rail are movable relative to the cantilevered arm 220 in the loose position and fixed relative to the cantilevered 220 arm in the tightened position.

In the embodiment of FIG. 7, the cantilevered arm 220 is similar to the embodiment of FIG. 6 but extends from a base 320 of the rear vehicle connector assembly 330 that is configured to be supported on the rear side/back door/window 340 of the vehicle with a plurality of straps 350. In this case, the structural arm 230 and hitch arm 240 (FIG. 6) are not present. The connector assembly 330 includes a plurality of arms 360 that extend from the base 320 and are adjustable to provide sufficient support from the rear side 340 of the vehicle. Likewise, the cantilever arm 220 is adjustable relative to the base 320 and can rotate relative to the rear side 340 of the vehicle. A plurality of feet 370 are attached to the arms 360 and can be adjustable relative to the contours of the rear side/back/door/window 340 of the vehicle. The straps 350 extend from the connector assembly 330 to attached to the vehicle to support the assembly thereon.

Although example embodiments been explained, it is to be understood that many other possible modifications and variations can be made without departing from the spirit and scope as herein described. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A bicycle clamp comprising:
a rail having an elongated orientation having a first end opposite a second end;
a first stabilizer coupled to the rail adjacent to the first end, wherein the first stabilizer includes a first support head and a second support head defining a first channel that circumscribes the first stabilizer; and
a second stabilizer coupled to the rail and movable along the rail, wherein the second stabilizer includes a first support head and a second support head defining a second channel that circumscribes the second stabilizer;
wherein the support heads have generally frustoconical shaped bodies,
wherein the slender portions of the frustoconical shaped bodies are configured to face one another to define each of the first channel and the second channel, and
wherein the first channel and the second channel are generally aligned along a common axis parallel to the rail; wherein at least one of the first support heads and the second support heads includes at least one groove positioned along a surface of the channel, wherein the groove extends across the surface of the generally frustoconical bodies from their slender portions to their broad portions.

2. The bicycle clamp of claim 1, wherein the first support head and the second support head are made from a rubber material having a durometer range between about 50 duro to about 90 duro.

3. The bicycle clamp of claim 1, wherein the first stabilizer includes a first clamp that is fixedly attached to the rail adjacent the first end of the rail.

4. The bicycle clamp of claim 1, wherein the second stabilizer includes a second clamp that is slidably attached to the rail, the second clamp having a tightening mechanism attached to the clamp, the tightening mechanism is configured to be toggled between a tightened position and a loose position such that the clamp is adapted to slide along the rail in the loose position and the clamp is adapted to be fixed in the extended position along the rail in the tightened position.

5. The bicycle clamp of claim 1, wherein the first channel of the first stabilizer and the second channel of the second stabilizer are aligned along a common axis as the second stabilizer slides along the rail.

6. The bicycle clamp of claim 1, wherein a cross sectional geometry of the rail includes at least one of a triangle, a square, a circle, a rectangle, a polygon, and an oval.

7. The bicycle clamp of claim 1, wherein at least one of the first stabilizer and the second stabilizer includes a tube strap,
wherein the tube strap is operably attached to the clamp at either the first support head or the second support head, extends across the channel formed by the support heads, and is operably attached to opposite support head.

8. The bicycle clamp of claim 1, wherein at least one of the first support heads and the second support heads includes at least one groove positioned along a surface of the channel, wherein the groove extends across the surface of the frustoconical shaped bodies from their slender portions to their broad portions.

9. The bicycle clamp of claim 1, wherein the bicycle clamp is configured to be suspended in the elevated position above the ground by a stand assembly and an attachment mechanism, the stand assembly having a base and the attachment mechanism is configured to rigidly attach to the rail.

10. The bicycle clamp of claim 9, wherein the attachment mechanism is configured to rotate around an axis that extends from the stand assembly.

11. A bicycle transportation assembly comprising:
a cantilevered arm configured to attach to an associated rear vehicle connector assembly, the cantilevered arm extending outwardly from the associated rear vehicle connector assembly,
wherein the rear vehicle connector assembly comprises at least one of:
a hitch arm configured to attach to a vehicle hitch assembly and a structural arm extending from the cantilevered arm to the hitch arm; and
a plurality of adjustable arms and straps, wherein the adjustable arms and straps extend from a base attached to the cantilevered arm; and
at least one bicycle clamp attached to the cantilevered arm, the bicycle clamp comprising:
a rail having an elongated orientation having a first end opposite a second end;
a first stabilizer coupled to the rail adjacent to the first end, wherein the first stabilizer includes a first support head and a second support head defining a first channel that circumscribes the first stabilizer; and
a second stabilizer coupled to the rail and movable along the rail, wherein the second stabilizer includes a first support head and a second support head defining a second channel that circumscribes the second stabilizer;
wherein the support heads have generally frustoconical shaped bodies,
wherein the slender portions of the frustoconical shaped bodies are configured to face one another to define each of the first channel and the second channel, and
wherein the first channel and the second channel are generally aligned along a common axis parallel to the rail; wherein at least one of the first support heads and the second support heads includes at least one groove positioned along a surface of the channel, wherein the groove extends across the surface of the generally frustoconical bodies from their slender portions to their broad portions.

12. The bicycle transportation assembly of claim 11, wherein the first rail and the second rail are configured to be toggled between a loose position and a tightened position, and wherein the first rail and the second rail are movable relative to the cantilevered arm in the loose position and fixed relative to the cantilevered arm in the tightened position.

13. A bicycle clamp comprising:
a rail having an elongated orientation having a first end opposite a second end;
a first stabilizer coupled to the rail adjacent to the first end, wherein the first stabilizer includes a first support head and a second support head defining a first channel that circumscribes the first stabilizer; and
a second stabilizer coupled to the rail and movable along the rail, wherein the second stabilizer includes a first support head and a second support head defining a second channel that circumscribes the second stabilizer,
wherein the second stabilizer includes a clamp that extends from the second stabilizer and is operably attached to the rail such that the second stabilizer is movable along the rail between the first stabilizer adjacent the first end and the second end, the clamp includes a tightening mechanism that is configured to be toggled between a tightened position and a loose position such that the second stabilizer is adapted to slide along the rail in the loose position and be fixed to the rail in a support position when the tightening mechanism is in the tightened position;
wherein the support heads have generally frustoconical shaped bodies,
wherein the slender portions of the frustoconical shaped bodies are configured to face one another to define each of the first channel and the second channel, and
wherein the first channel and the second channel are generally aligned along a common axis parallel to the rail;
wherein at least one of the first support heads and the second support heads includes at least one groove positioned along a surface of the channel, wherein the groove extends across the surface of the generally frustoconical bodies from their slender portions to their broad portions.

14. The bicycle clamp of claim 13, wherein the first channel and the second channel are aligned along a common axis as the second stabilizer slides along the rail.

15. The bicycle clamp of claim 13, wherein the bicycle clamp is configured to be suspended above the ground by a stand assembly and attachment mechanism, the stand assembly having a base and the attachment mechanism having a clamp configured to attach to the rail.

16. The bicycle clamp of claim 13, wherein the attachment mechanism is configured to rotate around an axis that extends from the stand assembly.

17. The bicycle clamp of claim 13, wherein at least one of the first stabilizer and the second stabilizer includes a tube strap,
wherein the tube strap is operably attached to the clamp at either the first support head or the second support head, extends across the channel formed by the support heads, and is operably attached to opposite support head.

* * * * *